340-567 SR

XR 3,958,118

United Stat TX 2043H

Schwarz

[11] 3,958,118

[45] May 18, 1976

[54] INTRUSION DETECTION DEVICES EMPLOYING MULTIPLE SCAN ZONES

[75] Inventor: Frank Schwarz, Stamford, Conn.

[73] Assignee: Security Organization Supreme-SOS-Inc., Stamford, Conn.

[22] Filed: Feb. 3, 1975

[21] Appl. No.: 546,629

[52] U.S. Cl. .......... 250/221; 250/209; 340/258 B

[51] Int. Cl.[2] .......... G01D 21/04

[58] Field of Search .......... 250/221, 203, 209; 340/258 B; 343/5 PD

[56] References Cited

UNITED STATES PATENTS

| | | | |
|---|---|---|---|
| 3,260,849 | 7/1966 | Polye | 250/203 R |
| 3,551,683 | 12/1970 | Tothill | 250/221 |
| | | ...ignes et al. | 250/203 R |
| 3,723,738 | | ...aner et al. | 343/5 PD |
| 3,824,392 | 7/1974 | Tibbling | 340/258 B |
| 3,864,566 | 2/1975 | Simpson et al. | 250/203 |

*Primary Examiner*—Alfred E. Smith
*Assistant Examiner*—D. C. Nelms
*Attorney, Agent, or Firm*—William G. Rhines

[57] ABSTRACT

This invention relates to intrusion detection devices, and in one embodiment includes an array of infra-red detectors with associated means for selectively increasing the number of scan zones which may be monitored by the same detector array, by providing an optical system with reflectors and/or lenses having a multiplicity of facets set at selected angles to direct primary impulses received from portions of the entire scanned field sequentially to the detector array.

31 Claims, 9 Drawing Figures

3958118
OR IN 250/221

Fig. 6.
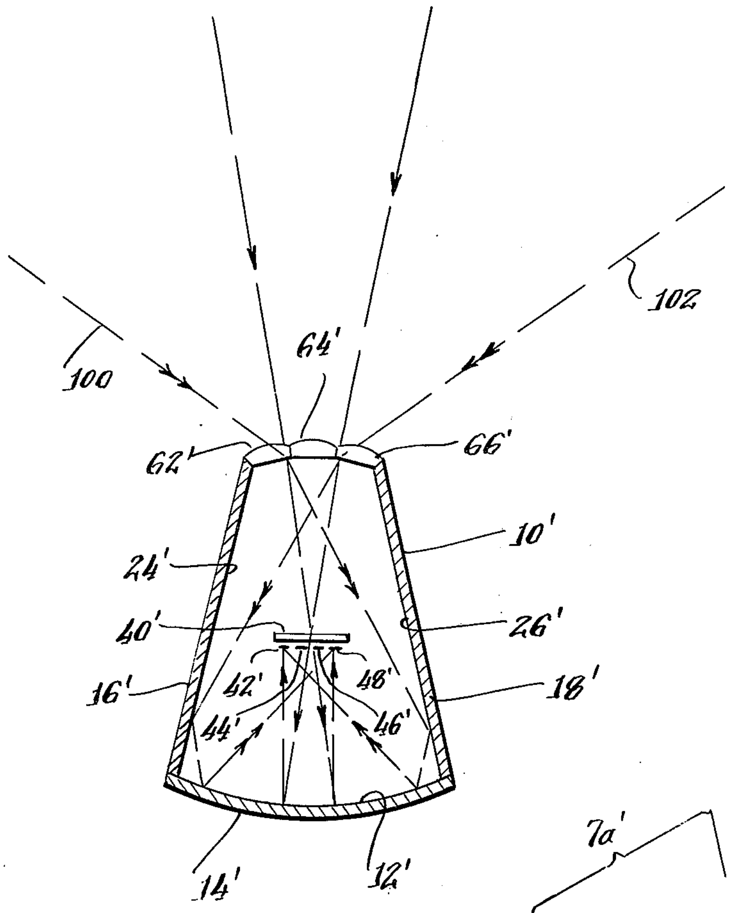
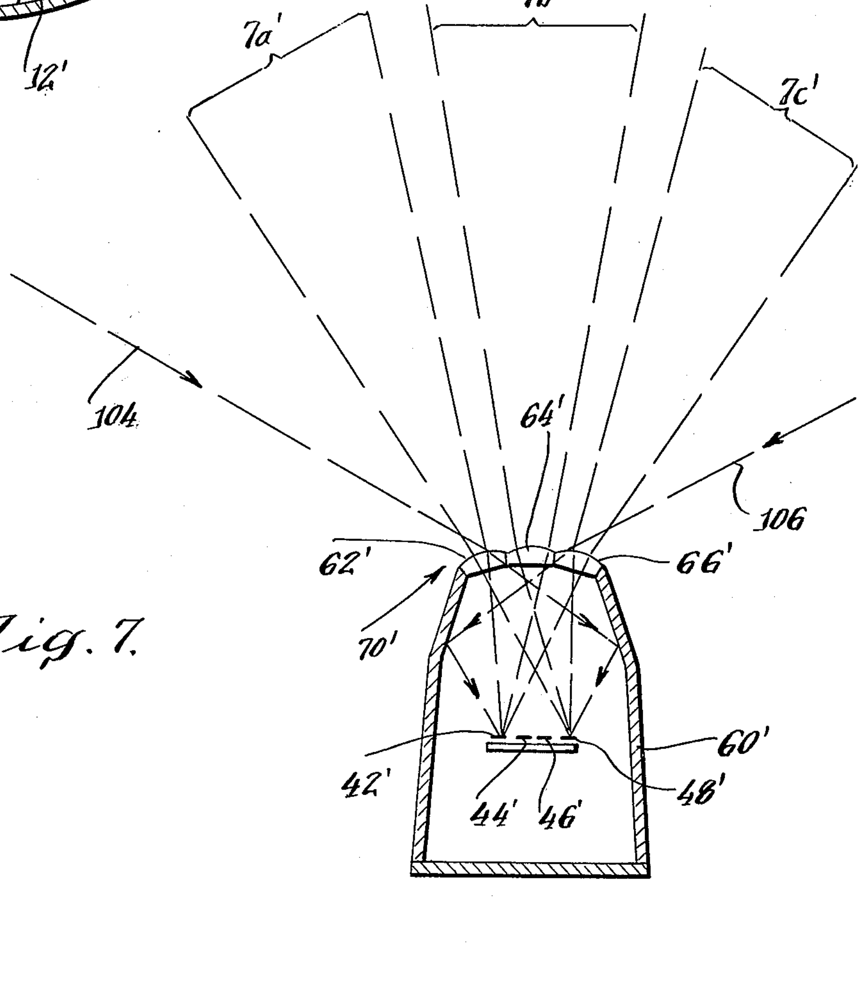
Fig. 7.

INTRUSION DETECTION DEVICES EMPLOYING MULTIPLE SCAN ZONES

BACKGROUND OF THE INVENTION

In the field of intrusion detection, i.e., the use of devices to detect the presence of physical objects for such uses as anti-burglar interception, and the like, it is known to use devices which are sensitive to infra-red radiation as it is propagated by objects, such as the human or other animal bodies, which are warm, and to cause the output of such detectors to pass through appropriate electronic circuits so that the movement of such a body from one zone of detection into another zone will cause an alarm to be triggered. In this connection, reference is made to U.S. Pat. No. 3,760,399.

However, a problem with prior art devices has been that they require the use of a multiplicity of detectors, as a single large group or as a grouping of smaller groups, in order to effect a wide scanning range without an intolerable amount of distortion. This increases the cost of the units significantly, not only because of the cost of the detectors, but because the units as a whole are larger and more complex. Additionally, prior art devices tended to be suited for single or limited applications in terms of the angular scan they are capable of monitoring, which also tends to increase the cost of units, since this made it impossible to produce larger production lots which can easily be modified for the particular usages desired.

Accordingly, it is an object of the present invention to provide devices for effecting a wide scanning range in intrusion detector devices with a reduced number of detectors. Yet another object of this invention is to provide a detector means that is capable of scanning a wide field without an intolerable amount of distortion. Another object of this invention is to provide such devices in such a form that they are readily adaptable to being modified for any of a number of different applications and scan widths. Still another object of the present invention is to provide a sensor unit with a narrow field of view which can be easily adapted to scan an effectively wide field by adding or substituting various combinations of lenses and/or reflectors. Yet another object of the present invention is to provide such devices in a form which is structurally simple and inexpensive to produce.

SUMMARY OF INVENTION

Desired objectives may be achieved through practice of the present invention which, in one embodiment, comprises a group of thermal detector devices suitable for detecting the presence of warm bodies through conversion of incident radiation into electrical impulses, in combination with an optical system consisting of a number of facets in an associated reflector and/or one or more lenses, which are so oriented that radiation originating within selected ranges of angular scan will be sequentially directed to the group of thermal detectors.

DESCRIPTION OF DRAWINGS

This invention may be clearly understood from the description which follows and from the accompanying drawings in which FIGS. 5, 6 and 7 illustrate other structures and embodiments of the present invention.

DESCRIPTION OF PREFERRED EMBODIMENTS

Figure 1:
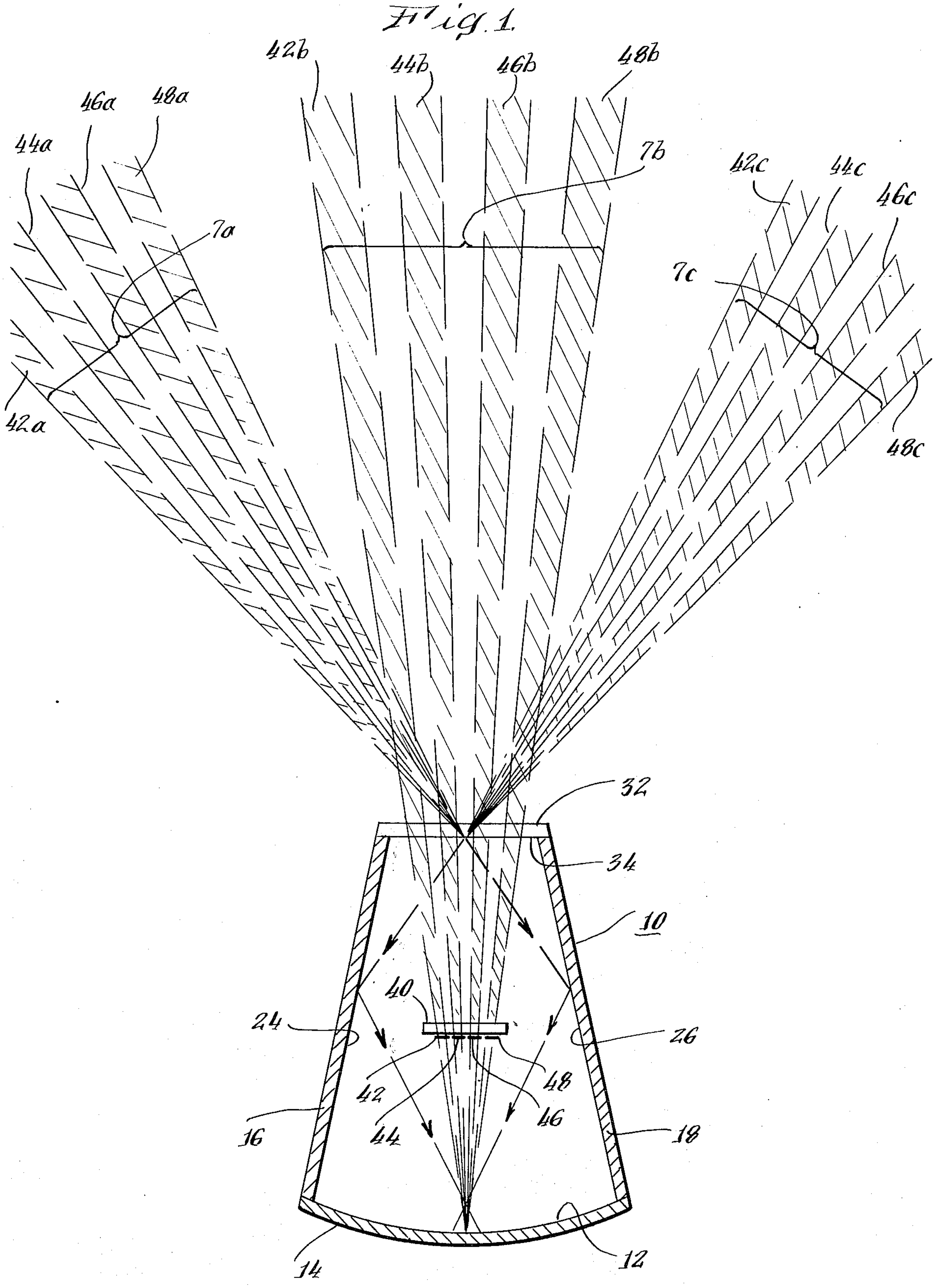
FIG. 1 illustrates one embodiment of the present invention.

Referring first to FIG. 1, there is shown an intrusion detector device which embodies the present invention. It comprises a housing 10, having a spherical or parabolic reflector 12 located on the inside of its back wall 14. The inside of the side-walls 16, 18 also have reflective surfaces 24, 26 respectively associated therewith. An aperture cover 32 which is transparent to the spectral region of the radiation being transmitted is used to effect closure of the aperture 34 of the housing 10.

Positioned within the housing 10 is a detector device 40 comprising several individual thermal detectors 42, 44, 46, 48, which are positioned in side-by-side relationship. These detectors may be of any of a wide variety of constructions suitable for the intended use, such as photoelectric, thermistor, thermoelectric, or pyroelectric devices of known per se construction. Pyroelectric devices have been found to be particularly satisfactory for this use because of their relative simplicity, reliability and low cost. It will also be clear from the description which follows that although this embodiment is described in terms of a detector unit which is adapted for detecting the presence of human bodies which, because of their normal temperature of 98.6°F., represent radiation of approximately 9.3 microns in wavelength, the principles of this invention may also be practiced for the detection of spacial energy transmissions in other wave lengths, such as those in the ultraviolet, visible, infrared and heat radiation ranges, provided corresponding and appropriate detection elements capable of transforming energy transmissions in such wavelengths into electrical impulses, are utilized. As shown in FIG. 1, such pyroelectric devices may be made from any of a wide variety of materials known per se to exhibit the desired thermal-electric characteristics, such as lead zirconate titanate, lithium tantanate, polyvynilidine flouride, triglycine sulfate, or the like, which has been applied to a solid substrate by known per se methods of evaporation, painting, sputtering, stenciling, masking, or silk-screening.

The electrode patterns may be in the form of rectilinear strips of metalization, so that in conjunction with associated optic means, zones may be monitored in the protected space, which zones are in the shape of vertically oriented strips. Alternatively, the detector elements may be in various patterns, so that the shape of the monitored fields may be correspondingly configurated into desired shapes. For example, they may be in the form of vertically oriented zig-zags, which will minimize movement entirely within one zone going undetected, as for example when an intruder is simply moving directly toward or away from the detector unit.

Figure 2:
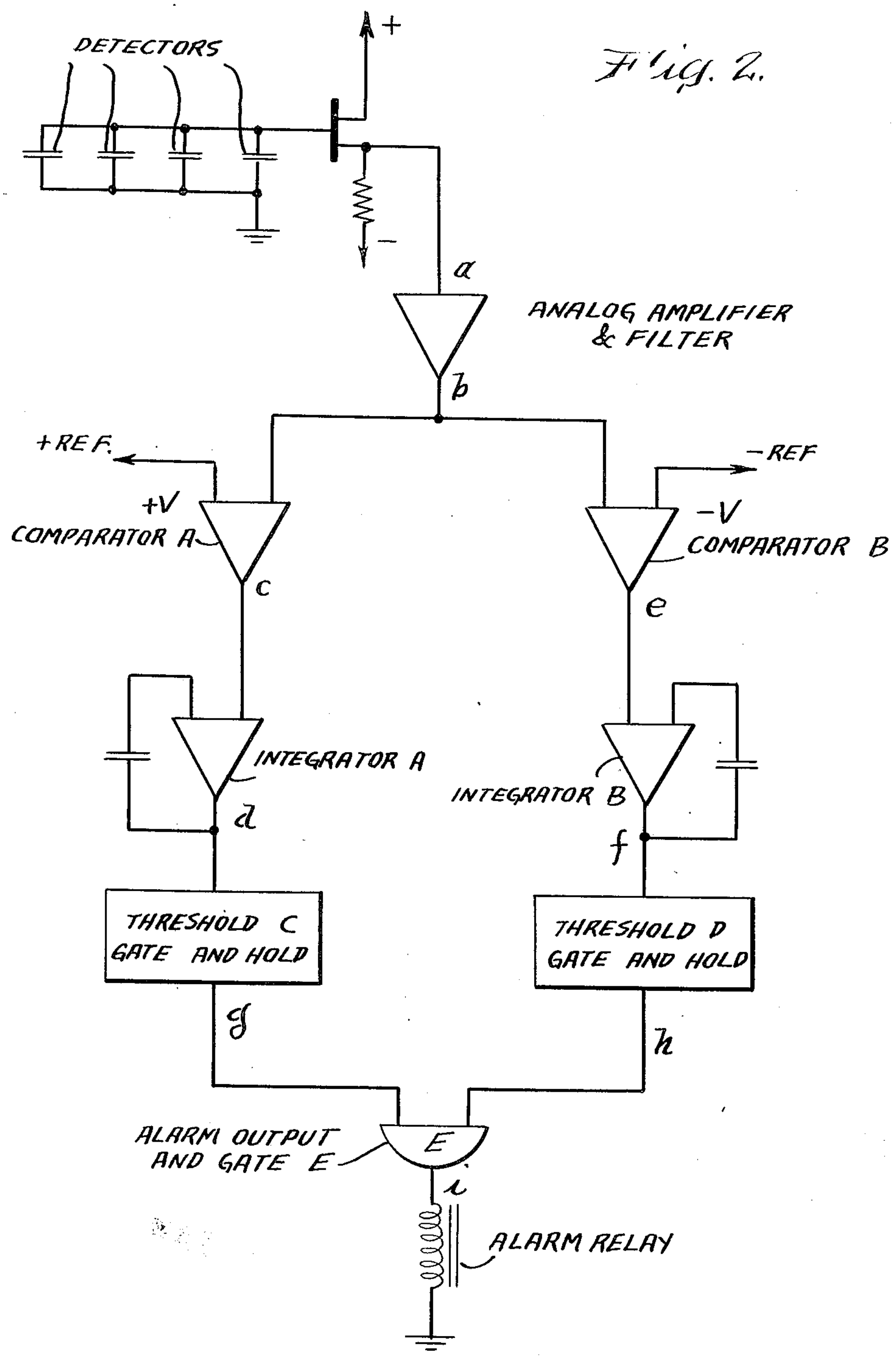
FIGS. 2, 2A, and 2B illustrate electronic circuitry useful in connection with embodiments of this invention.
Figure 2A:
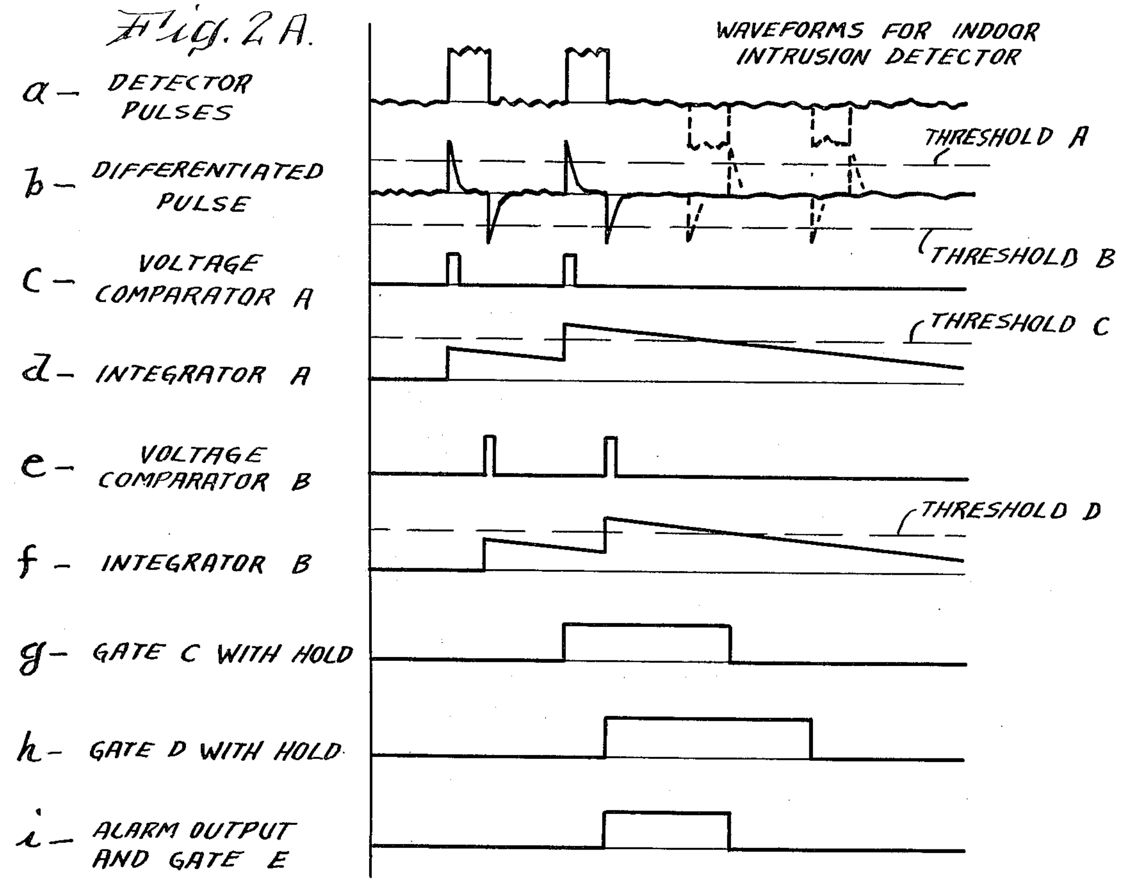
Figure 2B:
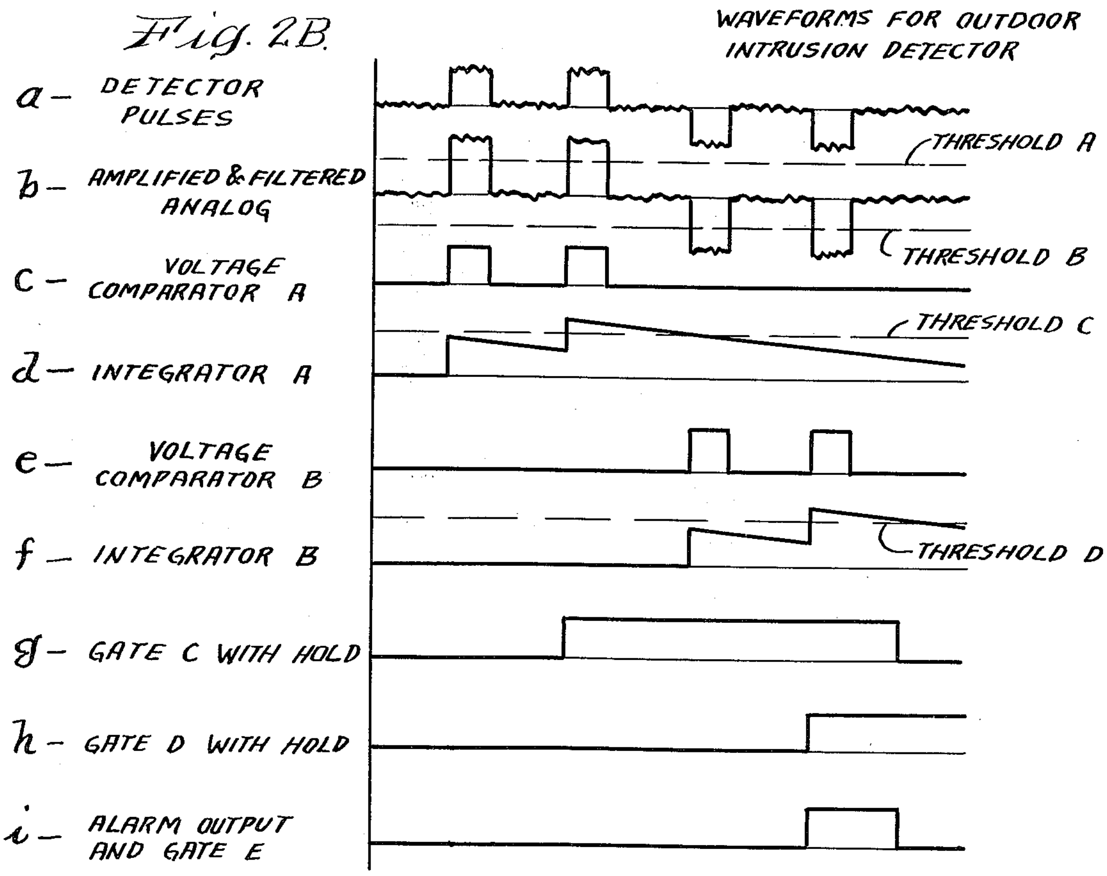

FIGS. 2, 2A, and 2B are schematics of associated electronic circuitry which may be utilized in connection with detector devices embodying this invention. The function of the electronics is to amplify the signals generated by the detector when an intruder moves through its field of view and, through recognition of the character of the signal pattern and by sophisticated logic, to identify a real intruder, while rejecting spurious pulses that emanate from natural background variations or artificial conditions not associated with motion of such a real intruder. Typical of processing circuits for both indoor and outdoor intrusion detectors (wide or narrow-field) is use of a sequence of four pulses of a given polarity and rate or time of occurrence. FIG. 2 is a block diagram of the processing circuit, and FIGS. 2A and 2B show typical waveform patterns for bonafide intrusions. As illustrated, the detectors feed an analog amplifier and filter, which passes the signals through comparators and integrators A and B, and into threshold gates and holds C and D respectively, which, in turn, feed into alarm output AND gate E and from thence to an alarm relay. The signal characteristic of such a circuit with respect to an intruder (e.g., person) moving through the field of view of a detector is shown in FIG. 2A. The analog amplifier differentiates the signal generated by the detector in the form of square wave pulses. Waveform *a* represents the square detector pulse train, while waveform *b* represents the differentiated pulse. Here the pattern is a positive pulse followed by a negative on *b*, repeated twice as the intruder moves through two adjacent detector column fields of view (the pair of adjacent detectors having identical polarity). If the signals generated exceed the threshold amplitude (A and B) they will emerge at the output of voltage comparators as normalized pulses as shown in line *c*. Similarly, detected signals passing through comparator B will be in a square wave form as shown in line *e*. The two sets of signals are then passed on to integrators A and B, and each is assigned a signal of a given input polarity; the output of the integrators being as shown as waveform characteristics *d* and *f* in FIG. 2A. When the output of an integrator A or B reaches a designated level C or D respectively, upon occurrence of at least two pulses of assigned polarity within a given integrator discharge time, a second Gate with a hold circuit arms the final alarm output AND Gate. As shown by waveforms *g* and *h*, for Gates C and D respectively, in FIG. 2A, if a set of two pulses occurs within the hold time of Gates C and D, a final alarm is generated in Gate E, (line *i* of FIG. 2A). This discriminating logic sequence makes false alarms negligibly rare, while making the probability of detection of a real intruder extremely high.

The processing logic for the outdoor sensor may be substantially identical to that of the indoor unit, with the waveforms being somewhat different but easily understood from the waveform sketches shown in FIG. 2B. Further, it will be clear that the number of zones through which a monitored object must move before the alarm is actuated may be varied as to number, and that the associated time lapse necessary to actuate the alarm may also be varied, so that the sensitivity of the detection unit may be varied as desired. It will be apparent from the foregoing description that the angle of scan of the device has to be limited sufficiently to ensure that a disturbing object is certain to invade at least two monitored segments, otherwise there will not be a change in state necessary to trigger the alarm. This means, then, that without the benefit of the present invention, a greater number of detector units, which are expensive as such and to install, would have to be used if a wide scan or a great number of narrow scans were desired; and this expedient raises materially the cost and complexity of the completed detector device.

However, referring again to FIG. 1, it will be apparent how practice of the present invention makes it possible to circumvent such difficulties, while, at the same time producing apparatus which is structurally simple, and inexpensive. As shown in FIG. 1, the scan segment 7*b* is comparable to that which may be achieved with prior art devices, since, as to this segment, signals are received through the aperture 34 and are reflected onto the detectors 42 . . . 48 via the reflector 12. It will be apparent that as an object emitting heat or otherwise differing in radiance from the background, such as a human body, compared to a wall of a room, passes through the scan segment, for example from left to right, energy, for example, in the form of heat being emitted therefrom, will impinge first on one of the detectors 42, and next on the adjacent detector 44, and so forth across the group of detectors, and that in accordance with the circuitry description set forth above, the effect of this will be to trigger the associated alarm if adjacent scan zones attributable to each such detector are invaded within an established time frame.

However, as also will be apparent from FIG. 1, the present invention makes it possible to widen the effective scan range of the detector device without widening the scan capability of the individual detectors or adding detector devices to the apparatus. This is achieved, in the embodiment shown in FIG. 1, through utilization of the reflective facets 24, 26 of the side walls 16, 18 as "multipliers". Thus, for example, the reflector 26 on the sidewall 18 is so positioned with respect to the detector device 40 and the reflector 12 on the back wall 14, that radiating objects traversing the scan field 7*a* will produce energy emission which will be reflected in sequence from one to another of the detector units 42 . . . 48. Comparable sequences will occur with respect to scan area 7*c* via reflector 24. It should be clear that the reflective sidewalls referred to above may be added as a unit to a basic detector unit that is primarily designed to scan a single zone (e.g., zone 7*b*), and thus that a narrow scan standardized unit may be easily adapted for wide scans with stock parts.

Figure 3:
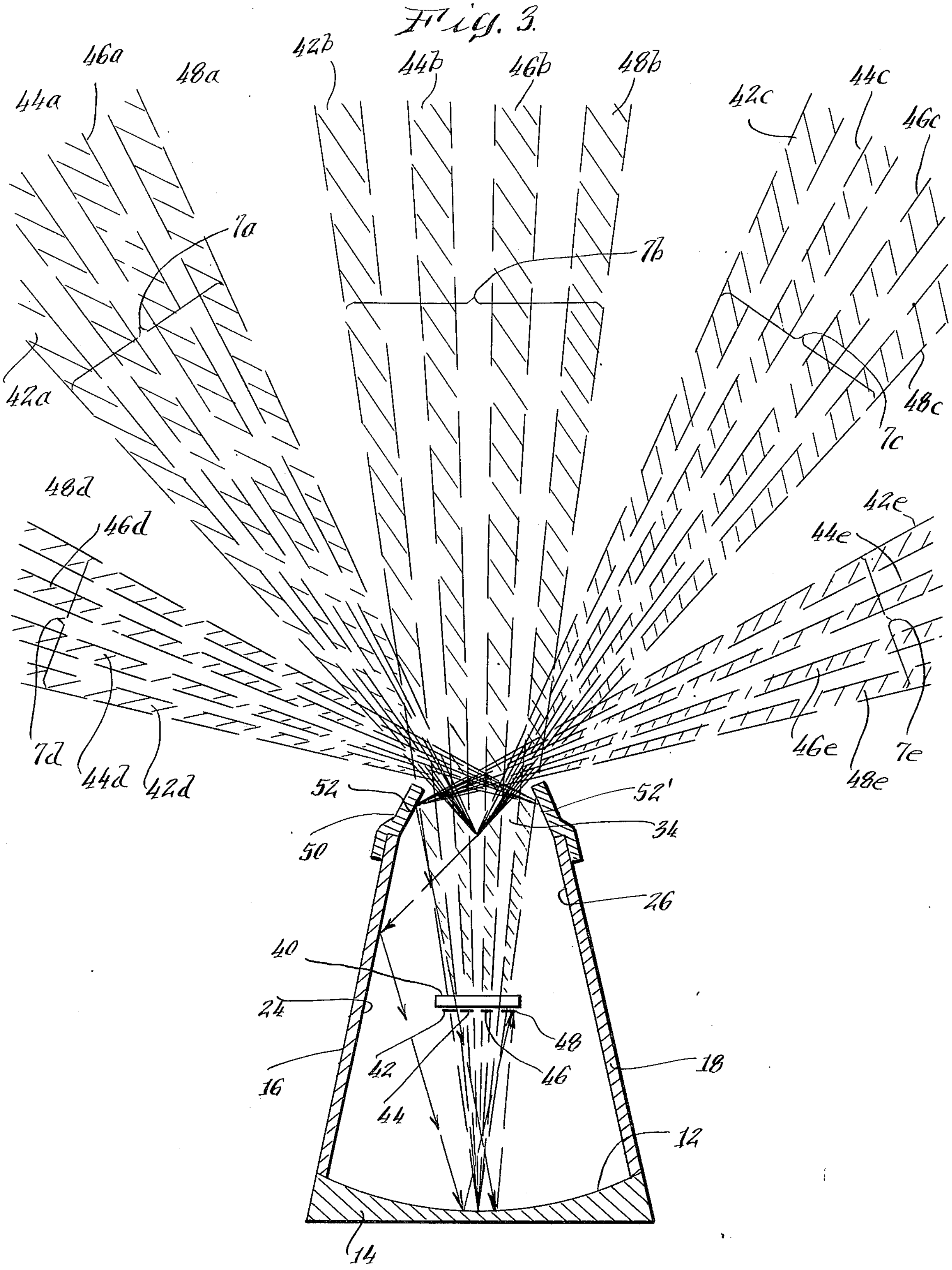
FIG. 3 illustrates another embodiment of this invention.

Turning next to FIG. 3, there is illustrated another embodiment of this invention having elements comparable to those shown in FIG. 1. However, additionally this embodiment has a supplementary member 50 in the form of an open cap collar, the inside surface 52' of which is a reflector. It will be apparent that by virtue of the addition of the member 50, in addition to monitoring the zone 7*b* as do the prior art devices and the embodiment shown in FIG. 1, and the zones 7*a* and 7*c* as does the embodiment shown in FIG. 1, this embodiment has been rendered capable of monitoring zones 7*d* and 7*e* as well. By this means, radiation from bodies moving through zone 7*d* will reflect from reflector 52' to reflector 12, and then to the detectors 42 . . . 48. Similarly, radiations from zone 7*e* will reflect off reflector 52 to the reflector 12, and thence to the same set of detectors 42 . . . 48. Thus, by simple adaptation, the same basic unit as that shown in FIG. 1 may easily and inexpensively be made useful to monitor wide scans, such as a room.

An illustration of the action of the field-of-view replication or multiplication process will explain the manner in which the optics work.

If $\phi$ = total protected angle $\alpha$ = field of view of the detector array $\beta$ = two spaces between adjacent fields of view, and $n$ = number of reflector elements needed then $(n+1) \cdot (\alpha+\beta) = \phi$ and if we wish to solve this equation for the number of reflectors ($n$) needed to cover a total system field of view $\phi$ $$\text{then } n = \frac{\phi}{\alpha+\beta} - 1$$

Typically the detector subtense, $\alpha$ may be 20° wide and $\beta$, the space between replicated zones may be 15° (7½° on each side). For covering an entire room, almost to the very edge of the walls adjacent to the sensor, an angle of about 175° may be desired.

$$\text{Thus, } n = \frac{175}{20+15} - 1 = 4$$

Therefore, as shown in FIG. 3, the four faceted (horizontally) reflector placed in front of the spherical reflector will make the sensor cover a horizontal field of view of about 175°, so that if the sensor is mounted in the middle of the wall of a room, the entire room will be protected against intrusion from any possible entrance.

Figure 4:
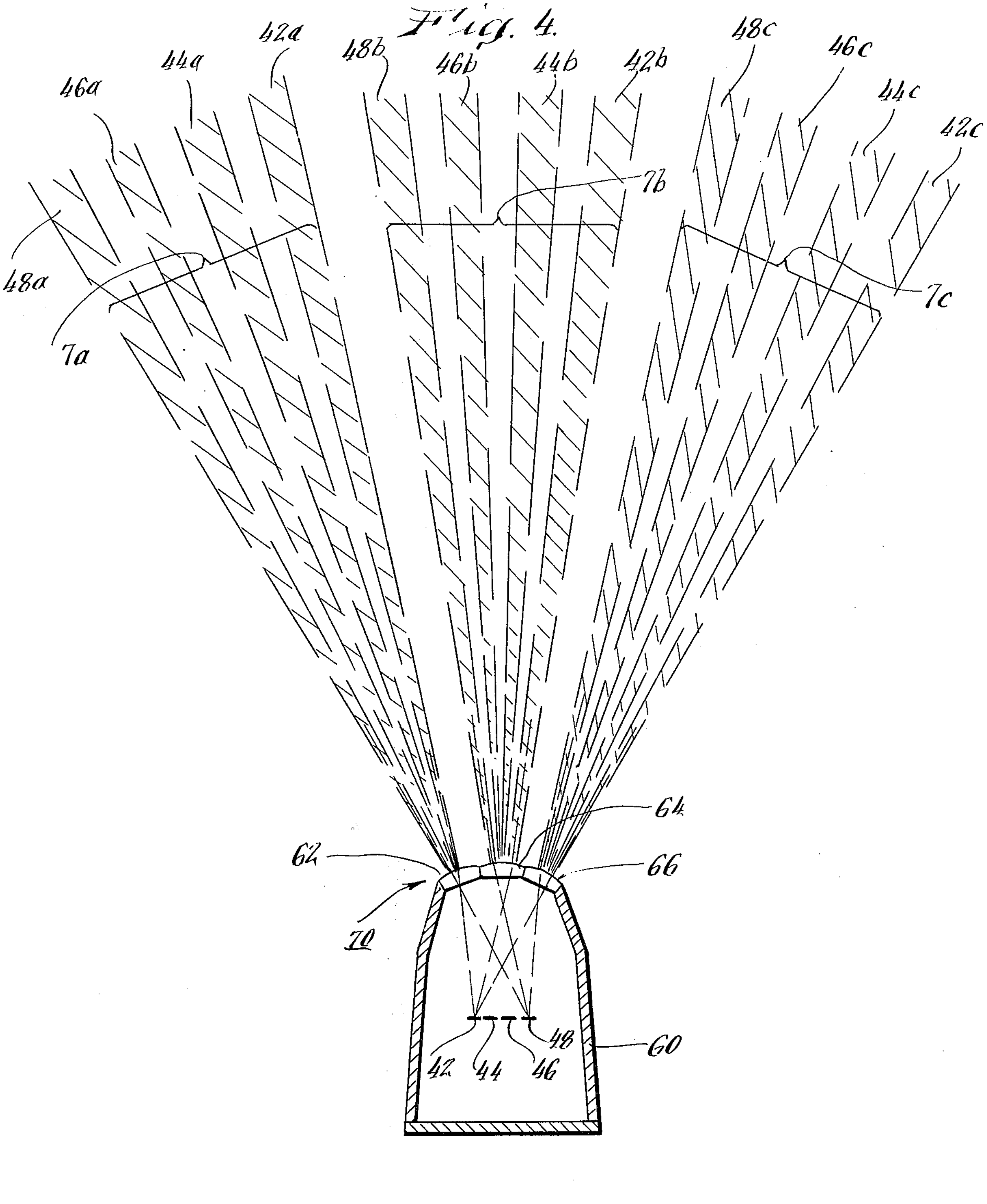
FIG. 4 illustrates another embodiment of this invention.

Turning next to FIG. 4, it will be apparent that a similar result may be achieved using a faceted lens 70 in the aperture 34 of a detector housing 60. From this illustration, it will be apparent that energy radiating bodies in scan fields may be monitored effectively utilizing a single group of detectors, but instead of reflecting the transmitted energy sequentially across the detectors forming the group as with the embodiment shown in FIG. 1, the transmitted energy is refracted by the facets 62, 64, 66, of the lens onto the detectors 42 . . . 48. Alternatively, such energy inputs may be focused directly onto an array of detectors facing toward the lens, or may be subjected to reflection from one or more intermediate reflection phases, including those of the type shown in FIGS. 1 and 3. Embodiments wherein energy inputs may be subjected to reflection from intermediate phases after passing through lenses are shown in FIGS. 6 and 7. It will be noted that the embodiment shown in FIG. 6 is similar structurally to that shown in FIG. 1 except that, like the embodiment shown in FIG. 4, it has lenses 62′, 64′ and 66′ instead of the cover 32. Its corresponding structural elements to those of FIG. 1 include reflective surfaces 24′,26′ and a parabolic reflector 12′, whereby energy inputs, for example such as those shown as 100, 102 may be subjected to reflection before impinging upon the detectors 42′–48′. In FIG. 7, there is illustrated another embodiment wherein energy inputs may be subjected to reflection from intermediate phases after passing through lenses. The structure of this embodiment corresponds to that of FIG. 4, with reflective inner walls of the housing 60′ of the double angle type shown in FIG. 3, whereby intermediate reflection will occur of energy inputs such as those shown at 104 and 106, which have passed through lenses, 62′–66′ corresponding to the lenses 62–66 of FIG. 4.

Figure 5:
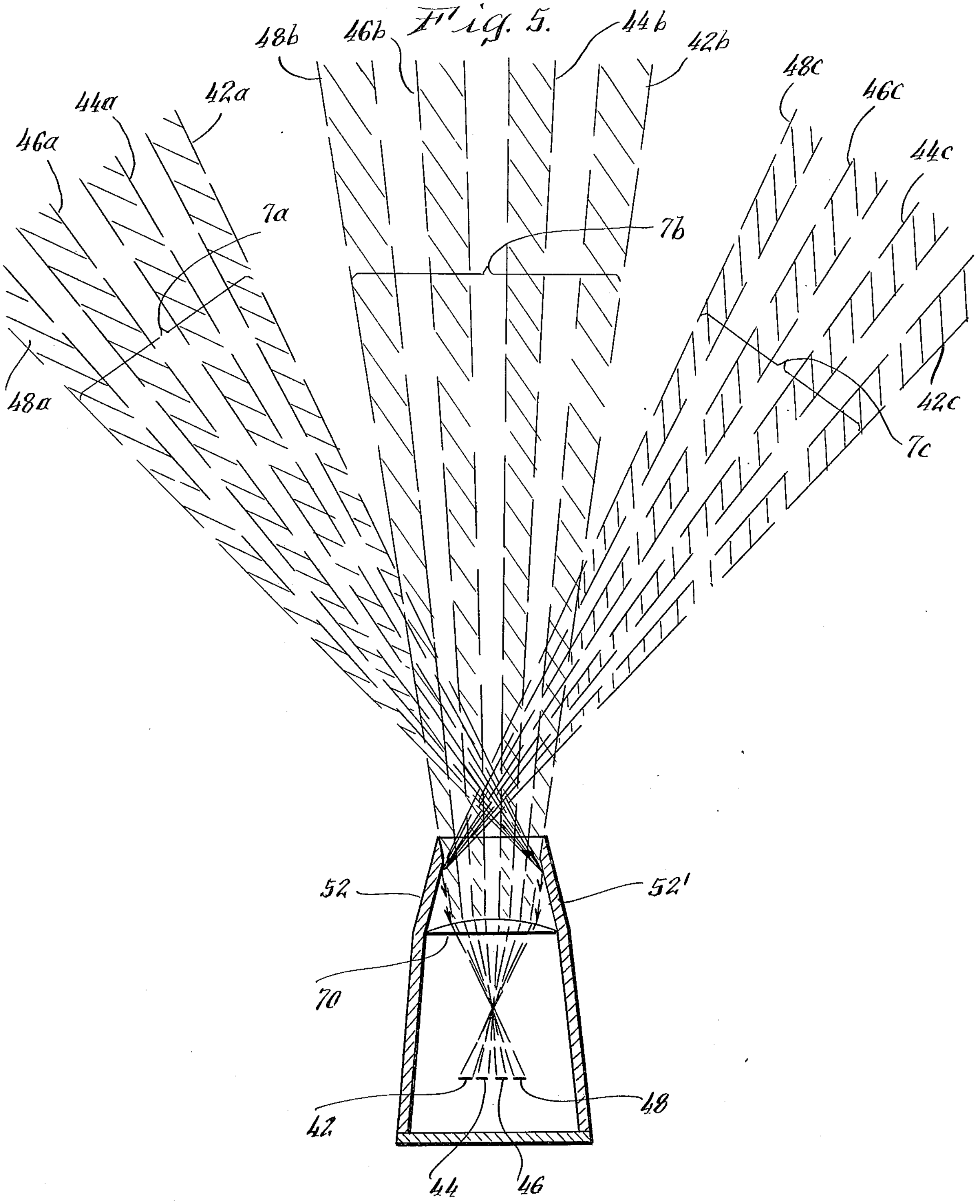

FIG. 5 illustrates another embodiment of this invention which combines both refraction by a lens 70 and reflection by reflectors 52, 52′, again to re-direct radiation onto a group of detectors 42 . . . 48.

It will be seen that an advantage of devices made in accordance with the present invention is that basic detector housing structures may readily be adapted for a wide variety of uses. Thus, for example, in monitoring the perimeter of a building, it is often desired to monitor a relatively narrow scan field which is very deep, immediately adjacent to the walls of the building. In such a case, a unit with a plain lens and without reflecting walls of the type heretofore described may be utilized. But it is sometimes desired to have wider scan ranges which need not be so depth efficient, for example in monitoring a room. It will be seen that the same basic unit may be readily and simply adapted for such use by the simple expedient of adding to a standardized detector unit a removeably attachable housing having inner reflection walls of the type heretofore described, and shown in FIG. 1, or a supplementary reflection cap to the aperture of the unit of the type heretofore described and shown in FIG. 3, or a faceted lens at the aperture of the type heretofore described and shown in FIG. 4, or combination of the foregoing, such as the one shown in FIG. 5, according to the exact design and scan configuration parameters which obtain. Obviously, such replacement parts might be mass produced at low cost and stocked conveniently, so that a wide variety of combinations might be offered to users at relatively low cost.

It is to be understood that the embodiments of this invention which have been described and illustrated herein are by way of illustration and not of limitation, and that this invention may be practiced in a wide variety of other embodiments without departing materially from the spirit or scope of this invention.

I claim:

1. For use in an intrusion monitoring device of the type which has a group of radiation detectors, each of which monitors a segment of a primary scan zone, and which produces an alarm signal when energy being emitted from bodies as they move among said segments is received by more than one of said detectors within a pre-determined time span, wherein no two adjacent segments are associated with the same detector a scan zone multiplier device for increasing the scan zone capability of said monitoring device to cover at least one secondary zone in addition to said primary scan zone comprising means for directing radiation energy being emitted from bodies in each of said secondary scan zones to said detectors whereby each of said zones will have at least one segment thereof monitored by a detector, and wherein no two adjacent segments within any of said secondary zones or between any of said secondary zones or between any of said secondary zones and said primary zone are monitored by the same detector.

2. The multiplier device described in claim 1 wherein said means comprises at least one reflective surface.

3. The multiplier device described in claim 1 wherein said means comprises at least one lens.

4. The multiplier device described in claim 1 wherein said means comprises at least one reflective surface in combination with at least one lens.

5. The multiplier device described in claim 2 comprising a housing adapted to be positioned about said group of detectors wherein the interior wall is said reflective surface.

6. The multiplier device described in claim 5 wherein said reflective surface has a first region for directing radiation energy from at least one first secondary scan zone, and has at least one other region, each of which other regions direct radiation energy from a secondary scan zone positionally interposed between said first secondary scan zone and said primary scan zone.

7. The multiplier device described in claim 5 wherein said reflective surface comprises two mirrors forming the inside of said housing, one on each side of said group of detectors, whereby secondary scan zones are formed on each side of said primary scan zone.

8. The multiplier device described in claim 6 wherein said reflective surface comprises two mirrors forming the inside of said housing, one on each side of said group of detectors, whereby secondary scan zones are formed on each side of said primary scan zone.

9. The multiplier device described in claim 3 wherein said means comprises a multiplicity of lenses positioned at the aperture of a housing in which said detectors may be positioned, each of said lenses being at a different angle positionally to a line normal to the plane of the group of detectors.

10. The multiplier device described in claim 4 wherein said means comprises at least one lens positioned at the aperture of a housing in which said detectors may be positioned, in combination with at least one reflective surface.

11. The multiplier device described in claim 10 wherein said reflective surface comprises two mirrors positioned one on each side of said lenses.

12. An intrusion detector device comprising an array of radiation detectors positioned in substantially flat planar orientation with a plane thereof substantially normal to the long axis of an elongated housing having an aperture therein surrounding said axis and side walls extending from said aperture substantially parallel to said axis, and having an arcuate reflective surface at the interior of the base of said housing for causing radiation energy passing from a radiating body through said aperture to be reflected to said detectors seriatim from a primary scan zone, as said body moves across said zone the improvement comprising reflective surfaces at the inside of said side walls whereby radiation originating in secondary scan zones outside said primary scan zone will be reflected via said arcuate surface to said detectors seriatim with movement of a radiating body across said secondary scan zones in a manner corresponding to that resulting from movement of such a body across said primary scan zone.

13. The device described in claim 12 wherein said reflective surfaces are positioned on each side of said array of detectors.

14. The device described in claim 13 wherein each of said reflective surfaces comprise two distinct juxtaposed substantially flat planar sections, one of which is adjacent to said aperture and is at a smaller angle with respect to said axis than is the other of said flat planar sections comprising said reflective surface, whereby two secondary scan zones are formed on each side of said primary scan zone.

15. An intrusion detector device comprising an array of radiation detectors positioned in substantially flat planar orientation with the plane thereof substantially normal to the long axis of an elongated housing having an aperture therein surrounding said axis and side walls extending from said aperture substantially parallel to said axis, the improvement comprising a group of lenses positioned in said aperture, the axis of one of which lenses is substantially congruent with said axis of said device and the axes of the other of said lenses being at progressively increasing angles with respect to said axis of said device as they are increasingly positionally removed from said one lens, whereby radiation originating in each among at least one secondary scan zones, will pass through one of said other lenses and will be transmitted to said detector seriatim with movement of these sources of said radiation across such secondary zones in a manner corresponding to that resulting from movement of such bodies across said primary scan zone.

16. The device described in claim 15 in combination with reflective surfaces located on the inside of the side walls of said housing.

17. The device described in claim 16 wherein said reflective surfaces are positioned on each side of said array of detectors.

18. The device described in claim 17 wherein each of said reflective surfaces comprise two distinct juxtaposed substantially flat planar sections, one of which is adjacent to said aperture and is at a smaller angle with respect to said axis than is the other of said sections associated therewith, whereby two secondary scan zones are formed on each side of said primary scan zone.

19. A scan zone multiplier device for use with an intrusion monitoring device of the type which has a group of radiation detectors, each of which detectors monitors a segment of a primary scan zone and which produces an alarm signal when energy being emitted from said bodies as they move through said segments is received by more than one of said detectors within a pre-determined time span and wherein no two adjacent segments are monitored by the same detector, which device has the effect of increasing the scan zone capability of said monitoring device to cover at least one secondary zone in addition to said primary scan zone, said multiplier device comprising an attachment adapted for removeable affixation to said monitoring device which includes means for directing radiation energy being emitted from bodies in each of said secondary scan zones to said detectors whereby each of said zones will have at least one segment thereof monitored by a detector, and wherein no two adjacent segments within any of said secondary zones or between any of said secondary zones or between any of said secondary zones and said primary zone are monitored by the same detector.

20. The multiplier device described in claim 19 wherein said means comprises at least one reflective surface.

21. The multiplier device described in claim 19 wherein said means comprises at least one lens.

22. The multiplier device described in claim 19 wherein said means comprises at least one reflective surface in combination with at least one lens.

23. The multiplier device described in claim 20 comprising a housing adapted to be positioned about said group of detectors wherein the interior wall is said reflective surface.

24. The multiplier device described in claim 23 wherein said reflective surface has a first region for directing radiation energy from at least one first secondary scan zone and at least one other region, each of which other regions are associated with a secondary scan zone positionally interposed between said first secondary scan zone and said primary scan zone.

25. The multiplier device described in claim 23 wherein said reflective surface comprises two mirrors forming the inside of said housing, one on each side of said group of detectors, whereby secondary scan zones are formed on each side of said primary scan zone.

26. The multiplier device described in claim 24 wherein said reflective surface comprises two mirrors forming the inside of said housing, one on each side of said group of detectors, whereby secondary scan zones are formed on each side of said primary scan zone.

27. The multiplier device described in claim 21 wherein said means comprises a multiplicity of lenses positioned at the aperture of a housing in which said detectors may be positioned, each of said lenses being at a different angle positionally to a line normal to the plane of the group of detectors.

28. The multiplier device described in claim 22 wherein said means comprises a multiplicity of lenses positioned at the aperture of a housing in which said detectors may be positioned, each of said lenses being at a different angle positionally to a line normal to the plane of the group of detectors.

29. The multiplier device described in claim 28 wherein said reflective surface has a first region for directing radiation energy from at least one first secondary scan zone and at least one other region, each of which other regions directs radiation energy from a seconary scan zone positionally interposed between said first secondary scan zone and said primary scan zone.

30. The device described in claim 29 wherein said reflective surface comprises two mirrors forming the inside of a housing adapted to be positioned about said group of detectors, one on each side of said group of detectors, whereby secondary scan zones are formed on each side of said primary scan zone.

31. The device described in claim 22 wherein said reflective surface comprises two mirrors forming the inside of a housing adapted to be positioned about said group of detectors, one on each side of said group of detectors, whereby secondary scan zones are formed on each side of said primary scan zone.

* * * * *